Oct. 30, 1956   C. A. LAUGHLIN   2,769,022
BATTERY CAP
Filed May 21, 1953

INVENTOR.
CLAYTON A. LAUGHLIN
BY Harvey J. Kinney
ATTORNEY.

United States Patent Office 2,769,022
Patented Oct. 30, 1956

2,769,022

BATTERY CAP

Clayton A. Laughlin, Minneapolis, Minn., assignor to Northwest Plastics, Inc., St. Paul, Minn., a corporation of Minnesota Application May 21, 1953, Serial No. 356,334

2 Claims. (Cl. 136—178)

This invention relates to storage batteries and provides for such articles a novel cap, which may be swung aside from the filler opening to permit filling of the battery with water or electrolyte. The invention also provides means for visibly determining when a proper quantity of water has been added to a storage battery cell, and also includes within it a valve means for venting from the battery gases which normally accumulate within a battery.

As is well known, the water or electrolytic fluid in storage batteries must be replenished from time to time. For that purpose, storage batteries are customarily provided with one or more filler openings upon their upper surface through which the electrolytic fluid may be poured. Such filler openings are normally fitted with a plug or threaded stopper which, of course, must be removed during the filling operation. It sometimes happens that this plug is mislaid or dropped into some inaccessible place during the filling procedure, and it is one object of this invention to provide a swivel type closure which need not be removed from the battery top in order to expose the filler opening. It is a further object of this invention to provide means (in association with said swivel cap) whereby it can readily be determined when a sufficient quantity of water has been added to the cell. It is also an object of the invention to include within the cap, means whereby gases which accumulate within the cell may be vented to the atmosphere.

Although others have previously sought to obtain the objectives outlined above, I do so by a novel type construction which is considerably simpler than any previous construction of which I am aware, and which, further, may be easily and inexpensively molded from plastic material such as polystyrene.

Further objects and advantages of the invention will appear from the following detailed description, and from the accompanying drawings, in which latter:

Figure 1:
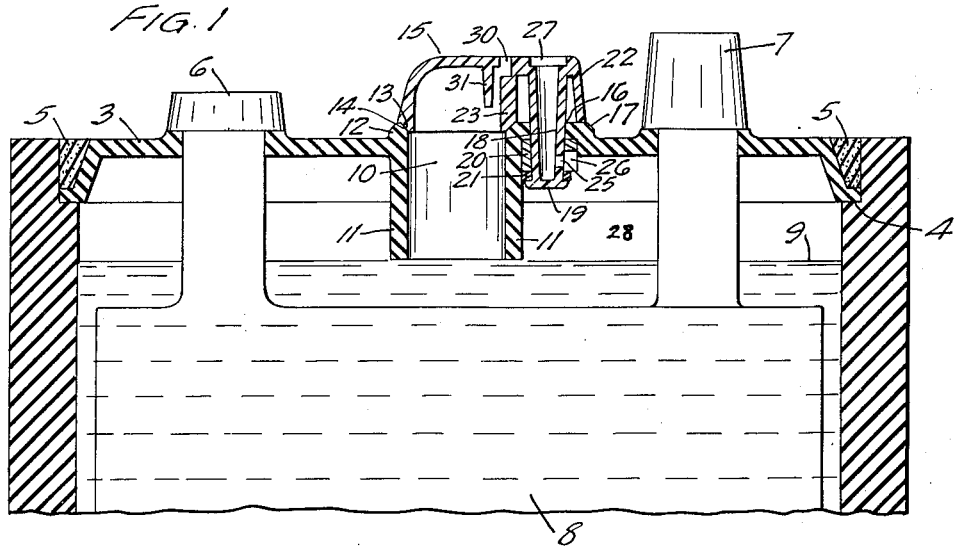
Figure 1 is a fragmentary vertical cross-sectional view of a battery provided with a cap of this invention.

Referring to the drawings in more detail, reference character 2 indicates a hard rubber case within which the battery construction proper, and the electrolytic fluid, etc. is contained. Said case is provided with a cover 3 which rests upon shoulders 4 of the case, and is there secured by a suitable sealing compound 5.

Projecting upwardly from the top of the case are inter-cell connector 6 and binding post 7 to which latter, in use of the battery, an electric circuit is connected. Said elements 6 and 7 are attached in the usual manner to the electrode of the battery, which in this case comprises plate 8. It should be understood that although the battery shown in Figure 1 comprises only one cell, it could equally well be constructed with any number of cells, to obtain the required voltage.

Figure 3:
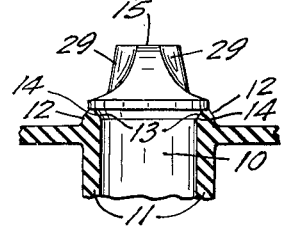
Figure 3 is an end view of the cap mounted on the filler opening.
Figure 5:
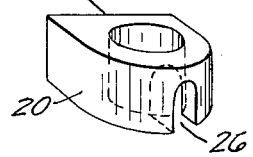
Figure 5 is a perspective view of the rubber grommet within which the cap is set.
Figure 6:
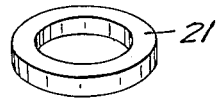
Figure 6 is a perspective view of the washer forming part of the means whereby the cap is held securely within the battery top.

In the battery shown, the water level is at the point where it should desirably be just after filling, and that point is indicated by reference character 9. Filler opening 10 and tube 11 extend from the top of the battery downwardly to the water level. Annular ring 12 with sloping edge 13 encircles filler opening 10 and projects somewhat above the top surface of the battery. This ring, as particularly shown in Figure 3, provides a seat for lip 14 when cap 15 is in closed position, thereby forming a water tight closure to prevent spillage, should the battery be jarred or tilted during use.

In addition to filler opening 10, battery top 3 is also provided with pivot opening 16, around which is formed boss 17, projecting above the top surface of the battery. Battery cap 15 is generally pear-shaped in plan contour, and downwardly projecting stock 18, having closed tip 19, is formed at the narrower end thereof. This stock, which tapers somewhat as it extends inwardly of the battery, is inserted through opening 16 in battery top 3 and the portion thereof lying within the battery is fitted with resilient grommet 20 and washer 21, both of which elements have a diameter somewhat greater than opening 16. Tip 19 of stock 18 is turned outwardly (e. g. by the application of heat and/or pressure thereon) so that it will bear against the periphery of washer 21, and hold grommet 20 flush against the underside of top 3. Stock 18 is thereby secured against withdrawal from opening 16.

Side edge 22 of cap 15, and division member 23 of cap 15 bear against the top surface of the battery and prevent stock 18 from dropping further within the battery. Grommet 20 is compressed to some degree as mounted on stock 18, and, by reason of its resiliency, will thereby function to keep the cap securely over filler opening 10 when said cap is in closed position. Resilient grommet 20 also permits the cap to be tilted slightly on the top of the battery so that lip 14 may be easily removed from the filler opening when it is desired to swivel the cap.

Stock 18 is rotatable within opening 16 so that cap 15 may be swung laterally aside to uncover filler opening 10. Grommet 20 is fixed on tube 16 with its flat edge 24 against tube 11 to prevent said grommet from turning with stock 18 when cap 15 is swiveled. Stock 18 is provided with venting aperture 25, and grommet 20 is provided with slot 26 for like purpose. As shown in Figure 1, said aperture and slot are in register when cap 15 is in closed position over filler opening 10. The top portion of stock 18 is also provided with aperture 27, and chamber 28, within the battery, is thereby put in communication with the atmosphere when cap 15 is closed: as shown in Figure 1. By this arrangement, gases given off within the battery cell pass off through stock 18 when the battery is being used; i. e., when the cap is closed.

Figure 2:
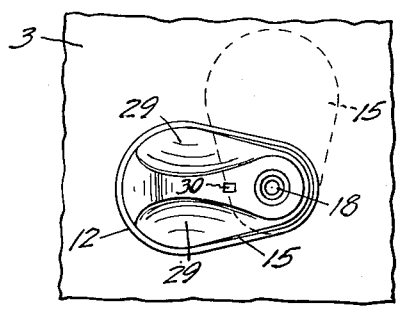
Figure 2 is a plan view of the cap, shown in closed position by the solid lines, and shown in open position by the broken lines.
Figure 4:
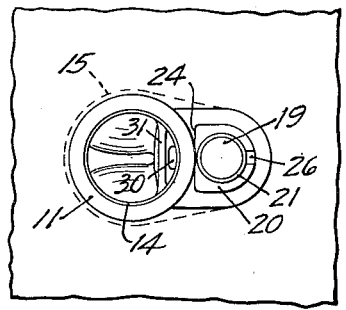
Figure 4 is a bottom plan view of the cap; i. e., looking upwardly from the bottom toward the top thereof.

When cap 15 is swiveled aside (to the position shown by broken lines in Figure 2) so that filler opening 10 is uncovered, aperture 25 in stock 18 is simultaneously and automatically turned out of register with slot 26, and the venting mechanism above described is thereby closed; i. e., gas in chamber 28 no longer has a passage by which it can escape to the atmosphere. When water is then poured into filler opening 10, it will rise in case 2 until it reaches the bottom edge of filler tube 11. When it reaches that level, shown by reference character 9 in the drawings, it can go no higher in the case because the air entrapped in chamber 28 will not permit it so to do. Additional fluid poured in (after the fluid in the case has reached water level 9) will rise in tube 11. When such additional fluid reaches the top of that tube, it will, of course, be visible, whereupon it will be understood that the battery has been sufficiently filled.

When cap 15 is then swiveled back to closed position, the venting passage will automatically be opened, whereupon the weight of fluid rising in tube 11, will displace air in chamber 28 and cause it to vent, whereupon said fluid in tube 11 will drop back down to the level of the water in the case.

For convenience in turning cap 15 the sides thereof are formed with recessions 29 into which the thumb and forefinger will fit when the cap is grasped. Surfaces of these recessions may be textured to provide a non-slip grasping surface.

A second vent 30 is provided in the cap to permit the escape of any gas which may be given off into tube 11, as, for example, when the bottom tip of that tube is below water level 9. Splash guard 31 is affixed in front of this vent to prevent any spillage therethrough, as will be apparent from the drawings. The cap of this invention may be integrally molded of plastic material, and is specifically designed for easy manufacture by a plastic molding operation. However, the simple design of this cap would be equally advantageous if, for example, the cap were made of rubber or other material.

It will also be apparent that certain of the mechanical details of construction could be modified within the scope of my invention, and I do not intend to be limited by the specific construction above described, or otherwise, except as defined in the claims appended hereto.

What I claim is:

1. An assembly comprising a storage battery, a swivel cap mounted on said battery, and means for maintaining said swivel cap mounted on said battery, the top surface of said battery being provided with a filler opening, from which depends a filler tube, and a pivot opening, said cap being made of plastic material to form an integral unit having a tubular stock portion and a stopper portion, said tubular stock portion extending vertically through said pivot opening and being rotatable therein, said stopper portion extending along the battery top for rotation with said stock portion, whereby said stopper portion may be swiveled on a horizontal plane to cover or uncover said filler opening, said means for maintaining the cap upon the battery including a resilient grommet affixed on said stock portion of the cap to prevent the same from being withdrawn from said pivot opening, said grommet being provided with a venting slot, said stock portion being provided with a venting aperture, said slot and aperture being in register when said stopper portion is swiveled over said filler opening, and being out of register when said stopper portion is swiveled off said filler opening, said stock portion having a vertical passage within it, the upper end of said passage communicating with the atmosphere, the lower portion of said passage communicating with said venting aperture, gases within said battery being permitted to escape therefrom upwardly to the atmosphere through said stock portion, when said stopper portion is swiveled over said filler opening.

2. In combination, a storage battery and a swivel cap therefor, said battery including a case adapted to be filled with liquid to an optimum liquid level point, a cover affixed upon said case, a filler opening in said cover, a filler tube depending from said filler opening and projecting interiorly of said case approximating to said optimum liquid level point therein, and a pivot opening in said cover, said swivel cap comprising a stopper portion and a tubular stock portion, said stock portion projecting interiorly of said battery through said pivot opening and being rotatable therein, said stopper portion being rotatable with said stock portion to cover or uncover said filler opening, said stock portion having a vertical passage within it, said passage, intermediate said optimum liquid level point and said cover being provided with an aperture communicating with the interior of said battery; a grommet of greater diameter than said filler opening mounted on said stock portion to overlie said venting aperture, said grommet being provided with a slot, said stock portion being rotatable within said grommet, said aperture being brought into register with said slot when said stock portion is rotated to cause said stopper portion to cover said filler opening, and turned out of register with said slot when said stock portion is rotated to cause said stopper portion to uncover said filler opening, the upper end of said vertical passage being in communication with the atmosphere, gases within said battery being permitted to escape to the atmosphere through said aperture and said vertical passage when said stopper portion is in position covering said filler opening, and means for maintaining said grommet on said stock portion.

References Cited in the file of this patent

UNITED STATES PATENTS

| | | |
|---|---|---|
| 2,220,005 | Smith | Oct. 29, 1940 |
| 2,603,672 | Reppert | July 15, 1952 |
| 2,647,159 | Lighton | July 28, 1953 |
| 2,649,494 | Martin | Aug. 18, 1953 |